United States Patent
Lany et al.

(10) Patent No.: US 12,097,662 B2
(45) Date of Patent: Sep. 24, 2024

(54) METHOD AND SYSTEM FOR MANUFACTURING A COMPONENT USING AN ADDITIVE PROCESS

(71) Applicant: Sensima Inspection Sàrl, Gland (CH)

(72) Inventors: Marc Lany, Rolle (CH); Frédéric Monnier, Cortaillod (CH); Bernard Revaz, Geneva (CH); Gilles Santi, Lausanne (CH); Adrian Spierings, Wittenbach (CH); Philipp Stoll, Horn (CH); Alexandre Staub, St. Gallen (CH)

(73) Assignee: SENSIMA INSPECTION SÅRL, Gland (CH)

( * ) Notice: Subject to any disclaimer, the term of this patent is extended or adjusted under 35 U.S.C. 154(b) by 526 days.

(21) Appl. No.: 16/762,784

(22) PCT Filed: Nov. 8, 2018

(86) PCT No.: PCT/IB2018/058783
§ 371 (c)(1),
(2) Date: May 8, 2020

(87) PCT Pub. No.: WO2019/092635
PCT Pub. Date: May 16, 2019

(65) Prior Publication Data
US 2021/0154745 A1    May 27, 2021

(30) Foreign Application Priority Data
Nov. 9, 2017    (CH) ....................... 1355/17

(51) Int. Cl.
*B33Y 10/00*    (2015.01)
*B22F 10/28*    (2021.01)
(Continued)

(52) U.S. Cl.
CPC ............ *B29C 64/393* (2017.08); *B22F 10/28* (2021.01); *B22F 10/80* (2021.01); *B22F 12/90* (2021.01);
(Continued)

(58) Field of Classification Search
CPC ......... B33Y 10/00; B33Y 30/00; B33Y 50/00; B22F 10/20; B22F 10/28; B22F 10/80; B22F 10/50; B22F 10/38
See application file for complete search history.

(56) References Cited

U.S. PATENT DOCUMENTS

| | | |
|---|---|---|
| 2014/0159266 A1 | 6/2014 | Bamberg et al. |
| 2016/0349215 A1 | 12/2016 | Todorov |

(Continued)

FOREIGN PATENT DOCUMENTS

| | | |
|---|---|---|
| DE | 102016201289 A1 | 8/2017 |
| DE | 102016201290 A1 | 8/2017 |

(Continued)

OTHER PUBLICATIONS

International Search Report & Written Opinion for PCT/IB2018/058783, dated Feb. 14, 2019, 11 pages.

*Primary Examiner* — Michael P Wieczorek
(74) *Attorney, Agent, or Firm* — BLANK ROME LLP

(57) ABSTRACT

The invention concerns a method for additive manufacturing a component by repetitively superposing and solidifying material layers according to a 3D model of the component. The method comprises the steps of scan, by means of an eddy current sensing unit (20), of a new solidified cross section (15) obtained by selectively solidifying a material layer so as to provide an integrity data (VMM) of a sensed portion (23). A difference between the sensed integrity data (VMM) and an expected integrity data (VEE) is then executed for detecting a manufacturing anomaly within this (Continued)

portion. The expected integrity data (VEE) is determined based on collected integrity data of a solid basic structure likely matching or being identical to a geometrical structure (41) obtained from the 3D model (40) of a portion corresponding to said sensed portion (23), said solid basic structure being manufactured or simulated according to another 3D model.

11 Claims, 3 Drawing Sheets

(51) Int. Cl.
*B22F 10/38* (2021.01)
*B22F 10/80* (2021.01)
*B22F 12/90* (2021.01)
*B29C 64/393* (2017.01)
*B33Y 30/00* (2015.01)
*B33Y 50/00* (2015.01)
*G01N 27/9013* (2021.01)

(52) U.S. Cl.
CPC ............... *B33Y 10/00* (2014.12); *B33Y 30/00* (2014.12); *B33Y 50/00* (2014.12); *G01N 27/902* (2013.01); *B22F 10/38* (2021.01)

(56) References Cited

U.S. PATENT DOCUMENTS

2017/0312821 A1\* 11/2017 DeFelice ................. B22F 10/50
2018/0111192 A1\* 4/2018 Ralls .................... G01N 27/025

FOREIGN PATENT DOCUMENTS

EP 1815936 A1 8/2007
EP 3238865 A1 11/2017

\* cited by examiner

METHOD AND SYSTEM FOR MANUFACTURING A COMPONENT USING AN ADDITIVE PROCESS

RELATED APPLICATIONS

This application is a national phase of PCT/IB2018/058783, filed on Nov. 8, 2018, which claims the benefit of Switzerland Application No. CH01355/17, filed on Nov. 9, 2017. The entire contents of those applications are hereby incorporated by reference.

FIELD OF THE INVENTION

The invention concerns a method and a system for additive manufacturing a component, such as a mechanical piece, a constituent or a part of a mechanical or electrical system, up to a prototype or a product.

DESCRIPTION OF RELATED ART

The recent evolution of the domain of additive manufacturing (AM) provides excellent tools not only for rapid and cost-effective manufacturing of prototypes and products but also for a single on-demand component, for a pre-production series of components and for a production of a limited number of components.

There is thus an increasing interest in manufacturing components that are conform to given quality norms and technical requirements so as to allow an use in high-demanding and normative application fields.

In an additive manufacturing process, such as a selective Laser Melting, a defect could arise due to a mismatch of manufacturing parameters, an inconsistence in the 3-dimension (3D) model of the component, an incorrect application of a material layer, a flaw in the material powder, or a bad thermal management resulting in hot spots and related geometrical or material defects. A non-destructive test of each manufactured component can thus provide a solution to this novel exigence.

DE102016201289 discloses a monitoring procedure for detecting defects in an additive manufactured component by iteratively collecting measures of material during the additive manufacturing by distinct sensing means.

US2014159266 discloses a monitoring procedure for an additive manufacturing procedure permitting to detect defects in the manufactured component by means of an eddy current sensor. The quality of the uppermost solidified material layer is evaluated by considering a preceding eddy current scan of deeper-lying solidified material layers.

BRIEF SUMMARY OF THE INVENTION

An aim of the invention is to provide a method and a system for additive manufacturing capable to assess a manufacturing quality not only for a component within a plurality of serially manufactured components, but also for a single manufactured component.

According to the invention, these aims are achieved by means of the methods claimed and by the additive manufacturing apparatus claimed.

This solution has the advantage with respect to prior art to be capable to equally detect anomalies (i.e. non-intended variation of the structural properties of the final manufactured piece which could potentially lead to a malfunction or a mechanical failure of the piece in future) in the bulk of a component as well as in regions of the component where a deeper-lying layer of solidified material does not exist, or where the scan of a deeper-lying region does not provide significant information.

At the contrary of prior art methods, the proposed solution provides thus a detection of anomalies in regions of the component without deeper-lying solidified material (such as overhanging region or holes) that are often critical regions for the mechanical function of a component, i.e. regions where the presence of a defect severely impacts the mechanical resistance and/or service life of a component.

Moreover, at the contrary of prior art methods based on non-destructive testing (NDT) techniques, the proposed solution provides an efficient detection of anomalies in portions of the components comprising voids and thin lattice-like structures. In the additive manufacturing, there is an increasing interest in optimizing component to be generated by additive manufacturing process by including more voids and thin lattice-like structures in their design so as to reduce their weight while keeping or improving their mechanical strength. Such optimized designs also comprise comparatively more zones without underlying layers than legacy designs optimized for conventional machining.

Another scenario where such a solidified additive layer is not present is when the additive process is used for the repair or coating/cladding of a component manufacture using another process such as machining or casting.

The solution further provides the advantage of being able to detect anomalies within a one-shot manufactured component as well as within the first component manufactured according to a given 3D model, without requiring a step of manufacturing of at least a reference component (according to the new 3D model) being accepted (by hand) as devoid of anomalies for retrieving reference/expected integrity data.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
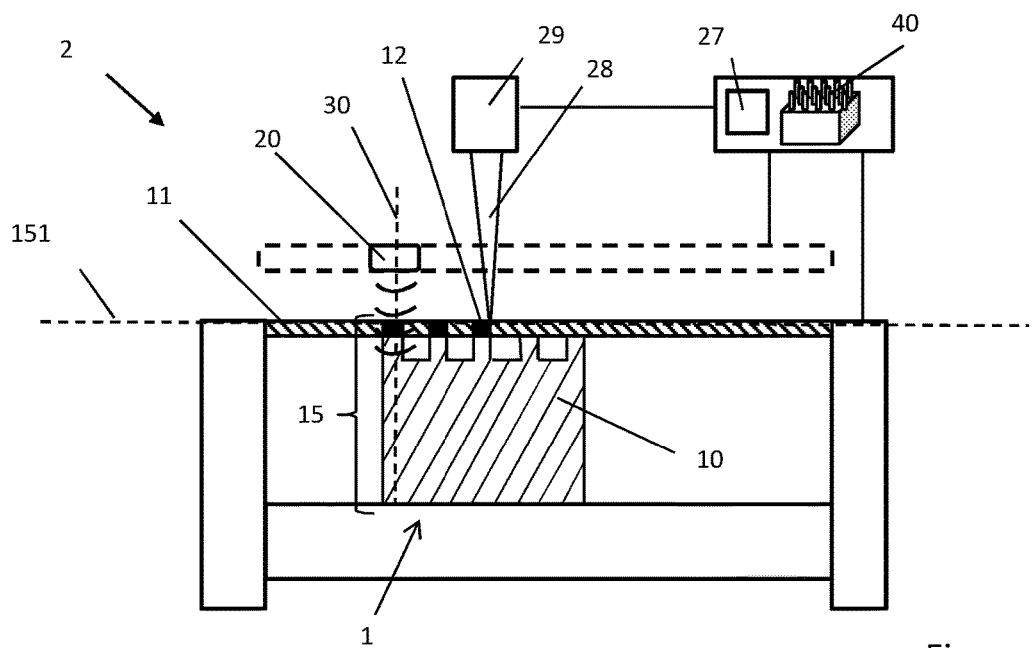
FIG. 1 shows a schematic view of an additive manufacturing system capable to detect a defect within a component, according to the invention.

FIG. 1 shows a schematic view of an exemplary additive manufacturing system comprising an additive manufacturing apparatus 2.

The additive manufacturing apparatus 2 is configured to manufacture a component 1 by iteratively applying a material layer 11 of material, notably in form of metallic powders, over a solidified cross section 10 of the component. A portion of the layer is then solidified (sintered) with the underlying solidified cross section 10 according to a 3D model of the component (i.e. a collection of data representing, in a continuous or discrete manner, the component being a solid volume within a three-dimensional space), so as to obtain a new solidified cross section 15. The material powder can be thus selectively solidified by selective Laser Melting, for example, by means of an high-energy beam 28 provided by a laser source 29 of the additive manufacturing system 2.

The additive manufacturing system comprises an eddy current sensing unit 20 operating in cooperation with the additive manufacturing apparatus 2. The eddy current sensing unit 20 permits to scan the new solidified cross section 15 being solidified by metallic powder providing an electrically conductive mass.

The eddy current sensing unit 20 comprises a single eddy current sensor (EC) or an array of eddy current sensors (ECs) so to sense a circulating flow of electrons, or currents, within a scanned conductor in response of an emitted (excitation) magnetic field. An eddy current sensor can be configured to generate the excitation magnetic field with a single, given excitation frequency. Alternatively, an eddy current sensor can be configured to generate the excitation magnetic field with a set of given excitation frequencies by means of an array of emitting elements (e.g. emitting/sensing elements).

Figure 2:
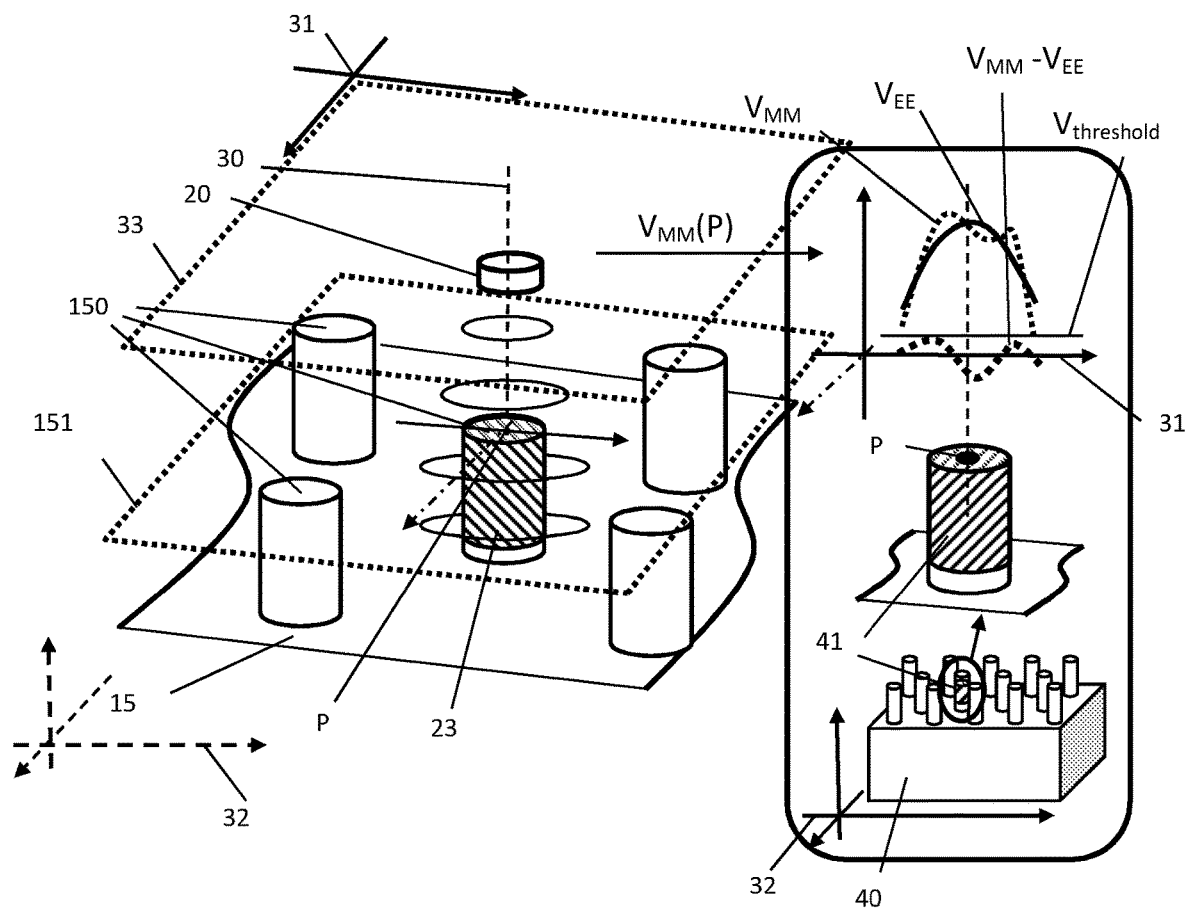
FIG. 2 shows a schematic view of an eddy current sensing unit operating on the additive manufacturing system of FIG. 1.

As illustrated in FIG. 2, the eddy current sensing unit 20 is part of the additive manufacturing apparatus 2 and is moved over the new solidified cross section so as to sequentially scan the cross section along a scanning axis 30. The scanning axis 30 is substantially perpendicular to the surface to be scanned, notably substantially perpendicular (i.e. 90°+/−5°) with respect to the plan 151 grouping the uppermost surfaces 150 (i.e. the surface being created by the solidification of the latest applied material layer 11).

In a preferred embodiment, each newly solidified layer is scanned by the eddy current sensing unit comprising a single sensing element or an array of sensing elements. The scanning is realized either in a continuous manner (by moving the sensor along a path or collection of paths covering the whole surface of the newly solidified layer), in a semi-continuous manner (by moving the sensor along a set of paths not necessarily covering the whole newly solidified layer but aimed at regions of particular interest) or at discrete positions of particular interest. The regions of interest are defined according to the particular intended properties of the part being manufactured, taking into account the response characteristics of the eddy current sensing unit.

The integrity data $V_{MM}$ provided by the eddy current sensing unit scanning a portion of the new solidified cross section is function of the electromagnetic properties (such as, but not limited to, its electrical conductivity and magnetic permeability) of the scanned portion, that depends on the integrity (absence of crack or non- uniformity within the solidified mass) and of the particular shape of the sensed portion.

The result of the scanning is a map or a collection of maps grouping the integrity data VMM provided by eddy current sensing unit to the points at which the measurements are realized. The set of points in the maps can hence form 3-dimensional (3D), two-dimensional (2D), one-dimensional (1D) or a point (0D) subspace or collection of such subspaces of the 3D space according to the manner in which they are generated.

In the field of non-destructive testing (NDT), a 2D-map of the signal (datas) provided by an eddy current sensing unit is usually called a C-scan.

Advantageously, the eddy current sensing unit 20 can be mounted on or attached to the movable part of the additive manufacturing apparatus (also called the "recoater") in charge of applying (or spreading) a new layer 11 of material powder over a freshly solidified layer or cross section 10. A significant deviation of the measured integrity from the expected integrity is a manufacturing anomaly (thereafter indicated as anomaly) which could potentially lead to a defect.

The additive manufacturing apparatus 2, or a remotely located server (not illustrated) being part of the additive manufacturing system, can thus be configured to detect an anomaly (potentially constituting a defect) by comparing the integrity data $V_{MM}$ provided by the eddy current sensing unit with respect to an expected integrity data $V_{EE}$. The expected integrity data $V_{EE}$ is a manufacturing data indicating a material integrity that a particular-shaped, flawless portion of the component made of a given material should exhibit at a given stage of the manufacturing of the component.

In order to provide a detection of anomalies in regions of the component without deeper-lying solidified material and in portions with voids and thin lattice-like structures, the expected data $V_{EE}$ is determined (e.g. computed) from the data provided by the 3D model of the manufactured component, typically from a geometrical structure 41 obtained (extrapolated) from the 3D model 40 of a portion that corresponds the (flawless and/or wanted) portion 23 of the component to be scanned.

In particular, the expected integrity data (VEE) can be advantageously determined based on collected integrity data of a solid basic structure likely matching or being identical to the geometrical structure 41 obtained from the 3D model, said solid basic structure being manufactured and/or simulated according to another 3D model.

Given the response of the eddy current sensing unit within its sensitive volume and the geometrical structure 41 and/or the volume of the portion to be scanned, the expected data $V_{EE}$ that the portion 23 should exhibit in the absence of an anomaly can also be determined based on (e.g. calculated as function of) of the relative positioning 30 of the eddy current sensing unit 20 with respect to the portion of the component, notably with respect to the geometrical structure 41.

For each relative position 30, the expected data $V_{EE}$ can be a single, scalar value representing a value that should be provided by an eddy current sensing unit (e.g. with a single EC) providing a single output data. The scalar value can be a real or a complex scalar value.

Alternatively, the expected data $V_{EE}$ can be a multi-dimensional vector that should be provided by an eddy current sensing unit operating at several frequencies, e.g. when the eddy current sensing unit comprises an EC having an array of emitting and sensing elements or an array of ECs. The vector can thus represent measurements of the complex impedance of the array of sensing elements or complex coupling between the array of sensing element at several frequencies and with multiple sensing elements configurations.

The above mentioned sensing element(s) of the EC can be one or more emitting/sensing coils (i.e. a coil configured to generate an eddy current within a portion of an object and to sense them), one or more sensing coil (i.e. a coils configured to uniquely sense an induced eddy current in an object), a solid-state magnetic element or sensor typically configured to sense pulsed magnetic field generated by an induced eddy current, or a combination thereof.

For permitting a use of different typologies of materials for the additive manufacturing process, the expected integrity data $V_{EE}$ can also be determined based on (e.g. calculated as a function of) the used and/or destined material powder and/or class of electromagnetic properties (e.g. electrical conductivity and magnetic permeability) resulting from a solidification of the material layer.

In order to provide a portability of the proposed method on various additive manufacturing apparatus and/or for manufacturing various typologies of components, the expected integrity data $V_{EE}$ can also be determined based on (e.g. calculated as a function of) a typology of the (used) additive manufacturing apparatus 1 and/or a set of additive process parameters selected for manufacturing the component.

The FIG. 2 illustrates a scanning of a surface point P of a portion 23 of a new solidified cross section 15 by means of the eddy current sensing unit 20. The provisional, new solidified cross section 15 has been selectively solidified according to the 3D model 40 of the component and according to a 3D coordinate system 32.

In this exemplary embodiment, the additive manufacturing system is configured to move the eddy current sensing unit 20 within a plane 33 over the uppermost surface 150 of the new solidified cross section 15 at a given height. The eddy current sensing unit 20 is moved within the plane 33 according to either a predefined path or according to a path defined from the 3D model of the component so as to focus the scanning uniquely on surfaces of the new solidified cross section 15.

The additive manufacturing system is thus configured to detect an anomaly (potentially a defect) located near the scanning point P by comparing the sensed integrity data $V_{MM}(P)$ provided by the eddy current sensing unit scanning a region around this point P and the expected integrity data $V_{EE}(P)$ for this point P. In particular, a defect is detected (assessed) by comparing the difference between the sensed integrity data $V_{MM}(P)$ and the expected integrity data $V_{EE}(P)$ with a thresholding data $V_{Threshold}(P)$ applicable for this point P.

The comparison, i.e. the difference, can be computed by the additive manufacturing apparatus 2 and/or by the remotely located server, for example by means of a computational unit 27 thereof.

The expected integrity data $V_{EE}(P)$ for the surface point P of the provisional solidified surface 15 is a material integrity data having to be sensed by the eddy current sensing unit 20 when scanning a corresponding point of an identical shaped, flawless portion of a component.

The expected data $V_{EE}(P)$ for inspecting a surface point P is thus determined taking into account the geometrical structure 41 that the sensed portion 23 should exhibit according to the 3D model of the component.

The sensed portion 23 at point P is the part of the component being manufactured which is predominantly probed by the eddy current sensing unit when at point P (in 3-dimensional space during the unfinished manufacturing process). The dimension of the sensed portion can be defined by the dimension or size of the eddy current sensing unit itself, the material properties of the manufactured component in the vicinity of point P at this moment in the manufacturing process, the geometry of the component being manufactured in the same vicinity and/or by the conditions of the measurement (e.g. the excitation frequency of the eddy current sensing unit).

This approach permits, by means of a given eddy current sensing unit, to assess anomalies (notably defects) not only within large, flat and compact portions of a provisional solidified cross section but also within portions of the component exhibiting smaller, non-flat and/or uncompact volume with respect to the portion probed by the eddy current sensing unit.

The expected integrity data $V_{EE}(P)$ can be computed either before starting the manufacturing of the component, just before the scanning or after the manufacturing (post-processing approach). In fact, the expected integrity data $V_{EE}(P)$ can be computed independently from a manufacturing of a (similar) component.

The expected integrity data $V_{EE}(P)$ can be computed by the additive manufacturing apparatus 2, the remotely located server, and/or by another device, for example by means of a computational unit 27 thereof.

The expected data $V_{EE}$ can be computed before a manufacturing of the component. Upon the fact that the 3D model of the component is available, a 3D grid of expected integrity data $V_{EE}(\cdot,\cdot,\cdot)$ (i.e. data being function of a 3D coordinate system) can be calculated from the 3D model according to a 3-dimension coordinate system. The 3-dimension coordinate system can differ from the 3-dimension coordinate system 32 used by the additive manufacturing system 2. The expected integrity data $V_{EE}(P)$ for a point P according to the 3D coordinate system 32 of the additive manufacturing machine is thus obtained by acquiring/identifying the corresponding expected integrity data of the 3D grid of expected integrity data $V_{EE}(\cdot,\cdot,\cdot)$.

In case of an expected data for a point P not coinciding with a spatial point of the computed 3D grid, the data $V_{EE}(P)$ can be provided by an extrapolation and/or an interpolation based on spatially closest expected integrity data of the computed 3D grid.

Alternatively, the 3D grid of expected integrity data can be in form of a plurality of two-dimensional (2D), planar grids of expected integrity data $V_{EE}(\cdot,\cdot)$ (i.e. layers), each 2D grid substantially corresponding and/or being parallel to a layer of material of the additive manufacturing system. The expected integrity data $V_{EE}(P)$ for a point P according to the 3D coordinate system 32 of the additive manufacturing machine is thus obtained by acquiring/identifying the corresponding expected integrity data of the planar 2D grid of expected integrity data $V_{EE}(\cdot,\cdot)$ of the concerned layer, e.g. $V_{EE}(\cdot,\cdot, layer_k)$.

In case of an expected data for a point P not coinciding with a planar point of the grid, the data $V_{EE}(P)$ can be provided by an extrapolation and/or an interpolation based on spatially closest expected integrity data of the computed grid.

Advantageously, a 3D grid of expected integrity data can be directly calculated upon a finalization of a 3D model of a new component and stored within the same digital support so to simultaneously dispose of the 3D model with the grid of expected data for the new component permitting to assess the manufacturing quality thereof.

As above discussed, the expected integrity data $V_{EE}(P)$ can be computed during the manufacturing of the component. For example, a single layer of expected integrity data $V_{EE}(\cdot,\cdot)$ can be calculated and/or extracted from a 3D grid of expected integrity data $V_{EE}(\cdot,\cdot,\cdot)$ during the application of a new material layer and/or a solidification of a new solidified of a region of the component.

Alternatively, the expected integrity data $V_{EE}(P)$ can be computed after the manufacturing (post-processing approach). This approach is based on an acquisition of a 3D grid of integrity data $V_{MM}(\cdot,\cdot,\cdot)$ provided by the eddy current sensing unit and subsequent comparisons for detecting anomalies (up to a defect) and/or generating a quality certificate for the manufactured component.

Depending on the selected approach for calculating the integrity data $V_{EE}$ and for detecting an anomaly (defect) by comparing this data $V_{EE}$ with the sensed integrity data $V_{MM}$ provided by the eddy current sensing unit, the additive manufacturing system 2 can be configured to:

transmit the collected 3D grid of sensed integrity data $V_{MM}$ to the remotely located server with or without the computed 3D grid of expected integrity data $V_{EE}$; or to receive the computed 3D grid of expected integrity data $V_{EE}$ from the remotely located server.

In the exemplary embodiment of the FIG. 2, a two-dimensional, planar grid of expected integrity data $V_{EE}(\cdot,\cdot)$ is calculated for the currently provisional solidified surface 15. In particular, the grid of expected data $V_{EE}(\cdot,\cdot)$ is calculated taking in consideration the eddy current sensing unit being moveable in the plane 31 and according to the coordinate system 31 thereof. This permit to define the expected integrity data $V_{EE}(\cdot,\cdot)$ according to the relative position of the eddy current sensing unit within his plan 33.

Advantageously, the expected integrity data $V_{EE}(\cdot,\cdot)$ can be expressed in the same unit of measurement of the phenomena sensed by the eddy current sensing unit, notably Volt (V) or Ampere (A).

The expected integrity data $V_{EE}$ (P) can thus be determined based on (e.g. computed as function of) a response and/or transfer function of an eddy current sensing unit, preferably identical to or even the same eddy current sensing unit used for detecting the anomaly In particular, the expected integrity data $V_{EE}$(P) can be computed based on already collected integrity data. In fact, the expected integrity data $V_{EE}$(P) can be computed based on collected integrity data that are related to a solid basic structure matching (i.e. identical or similar to) the geometrical structure 41 of the sensed portion 23, as schematically illustrated in the FIG. 3.

Upon a retrieval of the geometrical structure 41 the sensed portion 23 should exhibit according to the 3D model of the component, a solid basic structure 44 matching the geometrical structure 41 can be searched within a catalogue 43 of predefined solid basic structures 44a-n, each predefined solid basic structure of the catalogue being provided with their own collected integrity data 45a-n.

The collected integrity data 45a-n can represent or correspond to a representation of data (e.g. scalar or multi-dimension vector) that should be provided by an eddy current sensing unit.

Each of the predefined solid basic structures 44a-n of the catalogue concern a distinct structure, notably from the point of view of:
- a typology of the material used for additive manufacturing the component (notably the electromagnetic properties, e.g. electrical conductivity and magnetic permeability, of the used material),
- a surface pattern of the structure; and/or
- a geometric dimension or relationship between dimensions of the structure.

Figure 3:
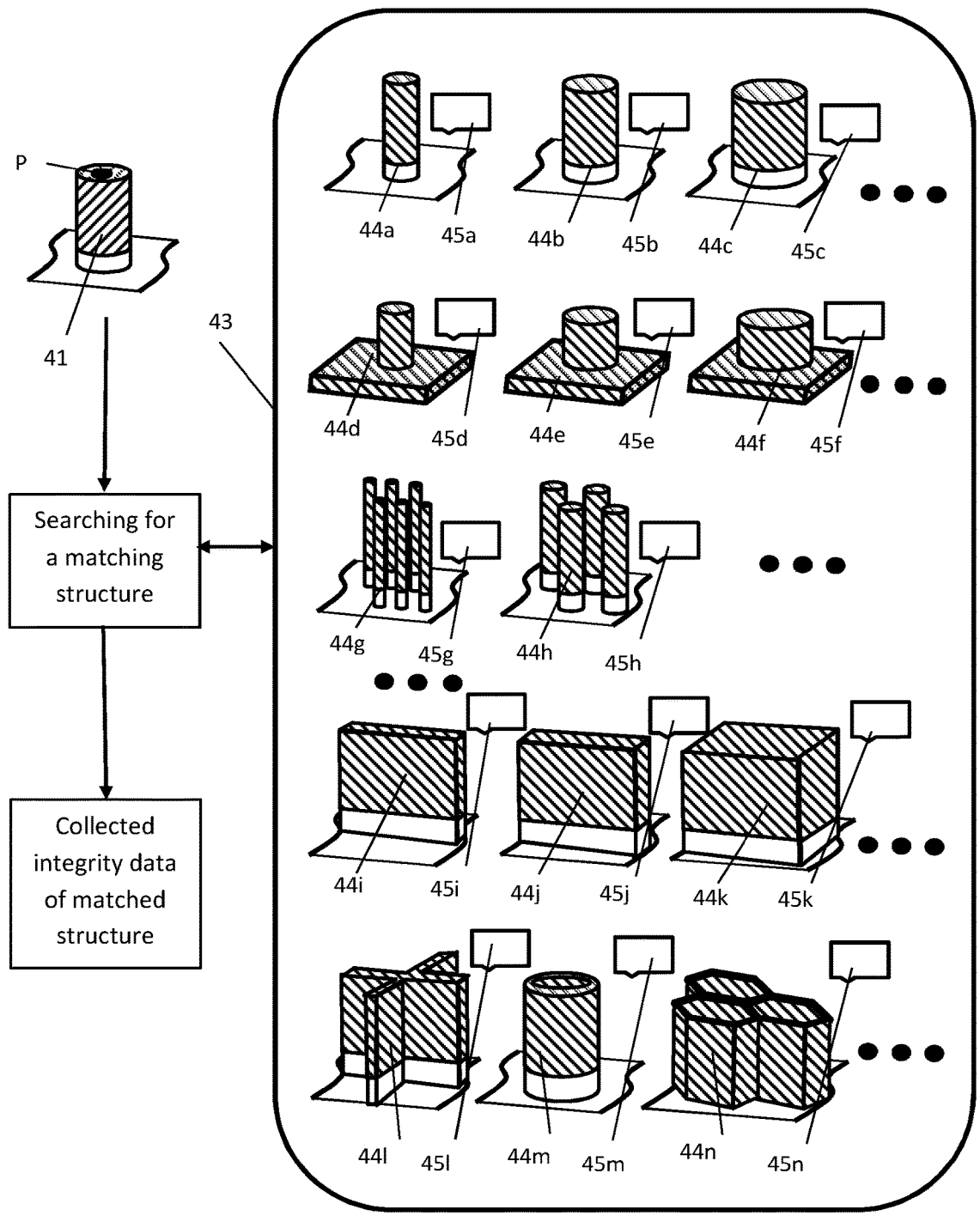
FIG. 3 shows a schematic view of a search for a structure within a catalogue of predefined solid basic structures of components, according to the invention.

As illustrated in the exemplary embodiment of FIG. 3, the surface pattern can consist in one or more parallel or incident pillars, one or more parallel or incident walls, one or more parallel or incident beams, a honeycomb, or a grid or lattice structure.

The collected integrity data (45a-n) of a given matched solid basic structure of the catalogue 43 comprise:
- a map resulting from a scan of this given solid basic structure exhibited by a reference object by means of an eddy current sensing unit; and/or
- a simulated map, i.e. a map obtained by simulating a scan of this given solid basic structure by an eddy current sensing unit.

The solid basic structures of the catalogue are manufactured and/or simulated according to at least a given 3D model. Preferably, each solid basic structure of the catalogue is manufactured and/or simulated according to a given 3D model being different from the others 3D model.

The 3D model used to manufacture and/or simulate one or more solid basic structure doesn't correspond to (and doesn't depend on) the 3D model of the component. In fact, the 3D model represents a single geometrical structure, eventually a subset of predefined geometrical structures, that can be likely part of the 3D model used for manufacturing the component (e.g. usable for modelling any component being manufacturable by the additive manufacturing system 2).

The solution provides the advantage of being able to detect anomalies within a one-shot manufactured component as well as within the first component manufactured by the additive manufacturing system 2 according to a new 3D model (i.e. a 3D model not already used for manufacturing a component, notably by means of the additive manufacturing system 2), without requiring initial steps of:
- manufacturing of at least a reference component according to the new 3D model
- accepting (by hand) at least one of these reference components; and
- retrieving reference/expected integrity data from said accepted reference component.

The simulated map can comprise a simulation of the eddy current sensing unit, notably of his sensor response. This can be realized, but not restricted, by means of Finite Elements Method (FEM) or a semi-empirical calculation of said sensor response using a set of parameters relevant to the conditions of the scan, eddy current sensing unit and material properties of the component obtained at least partially from previous measurements in similar conditions.

Advantageously, the eddy current sensing unit used for obtaining the map or the simulated map is either technically identical or the same eddy current sensing unit used for detecting the anomaly in the manufacturing component.

Alternatively or complementarily, the collected integrity data can comprise a digital identifier of the used and/or simulated eddy current sensing unit and/or a digital identifier for proposing a most appropriate eddy current sensing unit within a list of possible eddy current sensing units for scanning the selected solid basic structure.

Advantageously, the collected integrity data can comprises a set of manufacturing parameters for the additive manufacturing apparatus 2 permitting to optimally manufacturing the selected solid basic structure.

The applicant noticed that a reliable detection of anomalies is provided when the sensed and the expected integrity data concern a portion of the scanned portion that is lying below the uppermost surface of the new solidified cross section, especially the one before last solidified material layer.

In fact, the integrity of the latest solidified material layer will be likely affected by a solidification of an above applied material layer so as the integrity status of this layer has less up to no relevance as long as it is unsolidified within neighbouring material layers.

A detection of anomalies mostly or uniquely based on sensing and expecting integrity of uppermost superficial portion of the scanned portion can thus lead to unreliable results, notably in form of false detection of anomalies/defects up to false integrity conformity of the component.

In order to provide a more reliable detection of anomalies (notably of defects), the additive manufacturing apparatus 2 and/or the eddy current sensing unit are configured to sense a portion below the uppermost superficial portion of the new solidified cross section 15, while the expected data $V_{EE}$ is calculated so as to represent a material integrity data having to be sensed by the eddy current sensing unit 20 when scanning a corresponding, identical shaped, flawless portion of the component.

The additive manufacturing system 2 and/or the eddy current sensing unit are thus configured, for each point P to be scanned, to provide:
- a first integrity measured data $V_M(F_1, P)$ by performing a first scanning of the new solidified cross section so as to probe an uppermost superficial portion of the new solidified cross section 15 (i.e. up to a first depth within the new solidified cross section), and
- a second integrity data $V_M(F_2, P)$ by performing a second scanning of the new solidified cross section so as to probe the uppermost superficial portion and a portion below the uppermost superficial portion (i.e. up to a depth within the new solidified cross section that is deeper than the one of the first scanning).

Preferably, the uppermost superficial portion substantially corresponds to the latest solidified layer.

In a preferred embodiment, the first scanning is performed by emitting and sensing a first excitation frequency being greater than 100 kHz; while the second scanning is performed by emitting and sensing a second excitation frequency being lower than 50 kHz.

The sensed integrity data $V_{MM}(P)$ for the point P is thus determined based on (e.g. calculated in function of) $V_M(F_1, P)$ and $V_M(F_2, P)$, e.g. a linear combination of $V_M(F1,P)$ and $V_M(F2,P)$.

The expected integrity data $V_{EE}(P)$ for the point P is thus calculated taking into consideration the used function (i.e. linear combination) for obtaining $V_{MM}(P)$.

Figure 4:
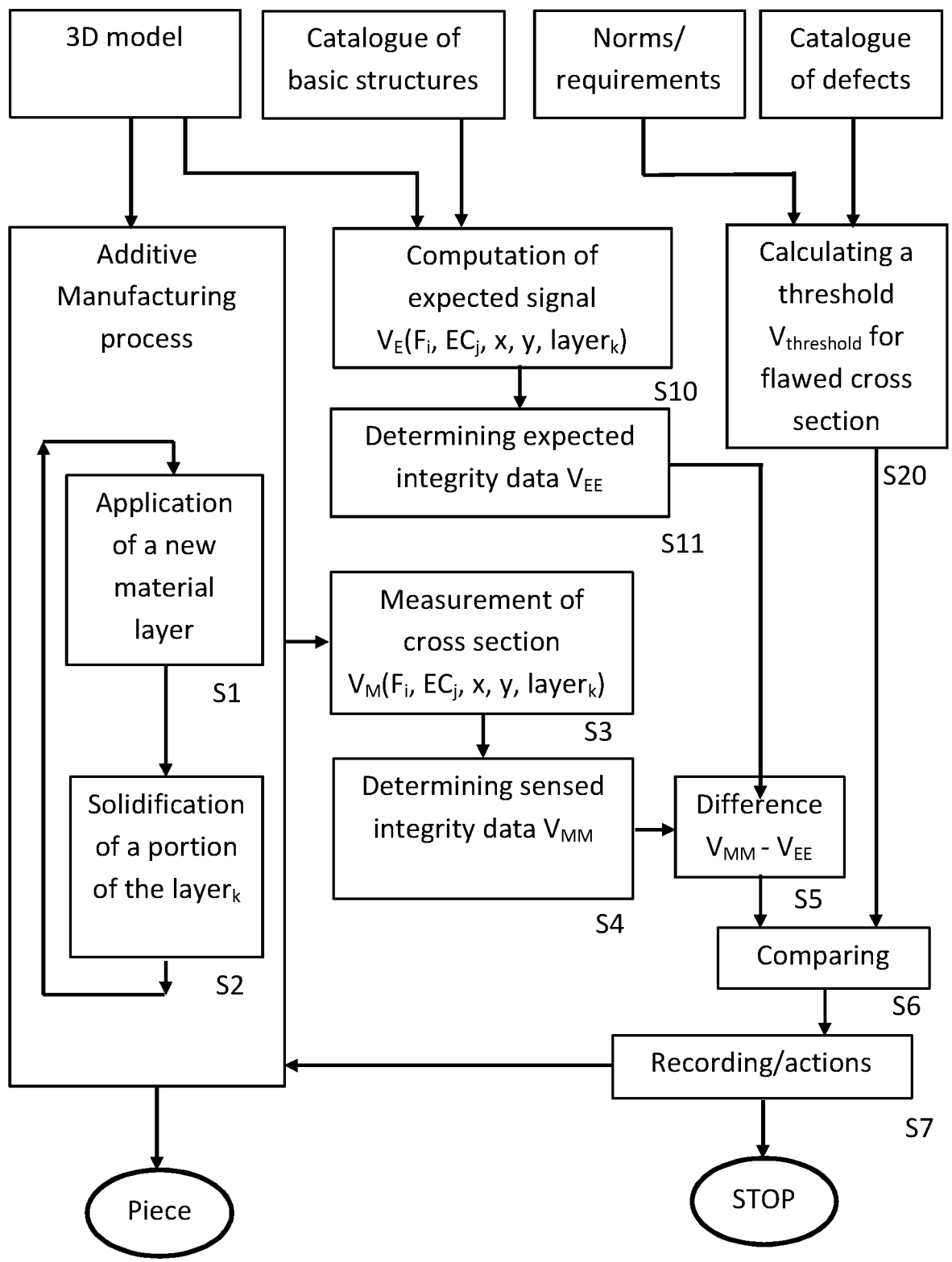
FIG. 4 shows a flow diagram of an embodiment of a method for detecting a defect, according to the invention.

FIG. 4 shows a flow diagram of an exemplary method for detecting a defect during an additive manufacturing process of a component based on a difference between the sensed integrity data $V_{MM}$ and the expected integrity data $V_{EE}$.

The method comprises, at each stage of an additive manufacturing process of a component consisting in an application of a new material layer (identified as layer$_k$) and a solidification of a portion thereof according to a 3D model of the component (Steps S1 and S2), a scan (Step S3) of the provisional cross section of the component so as to provide an integrity data $V_{MM}$ of a sensed portion thereof (Step S4).

The scan of the provisional cross section of the component can be operated upon a new provisional cross section being solidified or during an application of a successive material layer (Layer$_{k+1}$) above the already solidified provisional cross section.

A defect is then detected by computing a difference (S5) between the sensed integrity data $V_{MM}$ and an expected integrity data $V_{EE}$ for the sensed portion and then by comparing them with a given acceptable anomaly data threshold $V_{Threshold}$ applicable for this sensed portion (S6).

As previously described, the expected integrity data $V_{EE}$ is determined (Step S11) based on (as function of) the geometrical structure obtained from the 3D model of a portion corresponding to the (e.g. describing a flawless and/or wanted) sensed portion of the new solidified cross section. Moreover, the expected integrity data $V_{EE}$ is determined based on (as function of) collected integrity data assigned to one of the solid structure of the catalogue that likely match or is identical to this geometrical structure.

The method can thus comprise a step of searching within the catalogue of predefined solid basic structures for a solid basic structure matching the geometrical structure so as to determine (e.g. compute) the expected integrity data $V_{EE}$ based on (as function of) collected integrity data linked to the matched solid basic structure.

Advantageously, the method can focus on integrity assessment of underlying portions so as to provide more robust detection of anomalies (notably of defects), as previously described.

Advantageously, an eddy current sensing unit having a plurality of linear-positioned (1D) emitting/sensing elements or a linear (1D) array of eddy current sensors (EC) can be used to simplify the execution of the first and second scanning of the new solidified cross section. Assigning a different excitation frequency to one or a subgroup of these emitting/sensing elements or to one of more ECs of the array of eddy current sensors permits to perform the first and the second scan within a linear motion (of the eddy current sensor/array of array of eddy current sensors) over the new solidified cross section.

Alternatively, an eddy current sensing unit having 2D positioned emitting/sensing elements or a 2D array of eddy current sensors can be used to reduce the need for mechanical motion or to increase the speed of the measurement.

The aforementioned configurations may comprise substantially identical emitter/sensing elements or EC probes. Alternatively or complementarily, the aforementioned configurations may comprises emitter/sensing element or EC probes with different sizes or responses optimized for different anomalies (notably defects) and/or geometries of the component. For example, 1D or 2D configurations are known to give good results on bulk material, whereas others work better for detecting defects on or close to an edge.

In a preferred embodiment, the eddy current sensing unit having a plurality of linear-positioned (1D) emitting/sensing elements or the array of eddy current sensors (EC) are further configured to provide integrity measures, not uniquely based on two excitations frequencies, but on more than two excitations frequencies (i.e. multi-frequency scan). This approach permits to scan distinct typologies of new solidified cross section without to have to adapt the two excitation frequencies, as the most adapted (pair of) integrity measures can be simple chosen between the group of provided measures, e.g. by selecting the corresponding source (emitting/sensing element or EC). Moreover, this approach facilitates the above-mentioned post-processing of sensed integrity data $V_{MM}(\cdot,\cdot,\cdot)$.

In the illustrated example of FIG. 4, a given emitting/sensing element or $EC_j$ of the array provides a sensed integrity data $V_{MM}(F_i, EC_j, x,y, layer_k)$ of a point P defined by their coordinate x,y (S4) using a given excitation frequencies $F_i$. The given emitting/sensing element or $EC_j$ of the array can be configured to uniquely perform a scan with a single excitation frequency. Alternatively, the given emitting/sensing element or $EC_j$ of the array can be configured to sequentially perform a scan with two or more distinct frequencies.

In order to evaluate a presence of an anomaly on portion below the uppermost superficial portion, an integrity data $V_{MM}(x,y,layer_k)$ can thus be determined by means of a linear combination of two or more integrity measured data $V_M(F_i, EC_j,x,y, layer_k)$ provided by the eddy current sensing unit operating at n>1 excitation frequencies $F_i$ (Step 3).

The expected integrity data $V_{EE}(x,y, layer_k)$ for the point P is thus calculated taking into account n expected integrity data $V_{EE}(F_i,EC_j,x,y, layer_k)$ provided by the eddy current sensing unit and the combinational relationship thereof (Step 10).

The expected integrity data $V_{EE}(x,y, layer_k)$ for the point P can also be determined based on (e.g. calculated as function) of data provided by a statistical process control (SPC) monitoring similar components already manufactured and/or others components manufactured by the same additive manufacturing system.

The expected integrity data $V_{EE}(x,y, layer_k)$ and the sensed integrity data $V_{MM}(x,y,layer_k)$ for the point P can also be processed (e.g. calculated) so to better detect (distinguished by comparison) a given anomaly (notably a target defect).

An anomaly within a portion of this provisional solidified cross section can thus be detected in response of a deviation of the manufacturing data $V_{MM}$ provided by the eddy current sensing unit from the expected integrity data $V_{EE}$, wherein a defect can be assessed based on (notably as function of) the amplitude of the difference between these data (S5).

In order to permit an assessment of a manufacturing quality of the component, i.e. a conformity (compliance) or a nonconformity with respect to a given manufacturing requirement, the difference between the manufacturing data $V_{MM}$ and the expected integrity data $V_{EE}$ is further analysed with respect to this manufacturing requirement (S6).

The given manufacturing requirement can be a manufacturing norm, a manufacturing standard, an end-user requirement, a given largest acceptable anomalies or a combination thereof. The given manufacturing requirement can concern one or more typologies of material integrities of the component, such as porosities and material variations of the component, cracks and/or delamination of portion of the component.

The method and the additive manufacturing system can thus be configured to calculate a manufacturing data (i.e. acceptable anomaly data threshold) of a portion of a component having the largest acceptable anomaly that is described and/or extrapolated from given manufacturing requirement (Step 20).

This acceptable anomaly data threshold permits to assess either a conformity or a nonconformity of the detected anomaly (i.e. a defect) with respect to the given manufacturing requirement by comparing the difference between the manufacturing data $V_{MM}$ and the expected integrity data $V_{EE}$ with the acceptable anomaly data threshold.

The acceptable anomaly data threshold can be either a single, absolute maximal or minimal value. Alternatively, the acceptable anomaly data threshold can be a two-dimensional pattern or a vector.

The acceptable anomaly data threshold can be calculated from a database of given defects, from (a catalogue of) measures provided by eddy current sensing units sensing objects presenting given anomalies/defects or by a combination thereof.

The acceptable anomaly data threshold can be obtained and/or modified from data provided by the catalogue of predefined solid basic structures, i.e. acceptable anomaly data can be also determined based on (e.g. function of) the geometrical structure 41 obtained from the 3D model.

In response of a difference overpassing the acceptable anomaly data threshold, the method can comprise a step of interrupt the manufacturing process or to activate a correcting action for attempting to repair/correct the identified defect, e.g. by modifying a set of manufacturing parameters of the additive manufacturing apparatus.

The method and the additive manufacturing system can thus be configured to assess a manufacturing quality of the component (Step S7) in form of a digital and/or an alphanumerical label indicating either an absence or a presence of unacceptable anomalies (i.e. defects). The manufacturing quality assessment can include an indication about measures, positions and/or a degree of relevance of the detected anomaly and/or defect. The manufacturing quality assessment of the component can further involve an engraving and/or printing of a certificate of conformity, e.g. the digital and/or an alphanumerical label, on a surface of the component once completely manufactured. Alternatively or complementarily, the certificate can be digitally provided on a digital support connected and/or part of the additive manufacturing system.

According to another aspect of the invention, a reliable detection of anomalies (notably defect) can be provided by a method for additive manufacturing a component by applying a succession of superposed material layers, the method comprising the steps of:

applying a material layer 11 over a solidified cross section 10 of the component;

solidifying a region 12 of the material layer with the underlying solidified cross section 10 so as to build a new solidified cross section;

scanning the new solidified cross section 15 by means of an eddy current sensing unit so as to probe (sense):

an uppermost superficial portion of the new solidified cross section 15; and the uppermost superficial portion together with a portion below the uppermost superficial portion; assess an anomaly in deeper-lying material layers based sensed integrity data $V_M(F_1)$ provided by the eddy current sensing unit.

More advantageously, the sensed integrity data ($V_{MM}$) is provided by probing said sensed portion (23) of the new solidified cross section (15) by means of a plurality of distinct excitation frequencies, i.e. the eddy current sensing unit is configured to operate at multiple frequencies.

In one embodiment, the sensed integrity data $V_{MM}$ is provided by probing said sensed portion (23) of the new solidified cross section (15) by means of:

a first excitation frequency being greater than 100 kHz and a second excitation frequency being lower than 50 kHz.

NUMERICAL REFERENCES USED IN THE DRAWINGS

1 Mechanical component
10 cross section
11 material layer
12 solidified region
15 solidified cross section
150 uppermost surface of the solidified cross section
151 plane of the uppermost surface
2 Additive manufacturing apparatus
20 eddy current sensing unit
22 measured data
23 portion under scanning
27 Processing unit
28 Laser beam
29 Laser source
30 coplanar 2D positioning
31 2D coordinate system
32 3D coordinate positioning
33 scanning plane
40 3D model
41 geometrical structure
42 expected data
43 catalogue
44a-n solid structure
52 mathematical difference between measured and expected datas 53 threshold for a flawed cross section
S1-S20 Steps of the method for detecting a defect

The invention claimed is:

1. A method for an additive manufacturing of a component by repetitively superposing and solidifying material layers, according to a 3D model of the component, the method comprising the steps of:
    applying a material layer over a solidified cross section of the component;
    solidifying a region of the material layer with the underlying solidified cross section so as to obtain a new solidified cross section;
    sensing the new solidified cross section by means of an eddy current sensing unit so as to provide an integrity data of a sensed portion thereof, and
    detecting a manufacturing anomaly of said new solidified cross section based on a difference between the sensed integrity data and an expected integrity data;
    wherein the expected integrity data is determined based on collected integrity data of a solid basic structure representative of said sensed portion of the new solidified cross section, wherein said solid basic structure is selected from a catalogue of predefined solid basic structures with their corresponding collected integrity data, and wherein each of said predefined solid basic structures is manufactured or simulated using a 3D model other than that of the others of said predefined solid basic structures and other than that of the component.

2. The method according to claim 1, wherein
    the expected integrity data is also determined based on a response and/or transfer function of said eddy current sensing unit.

3. Method according to claim 1, wherein said collected integrity data comprises:
    a simulation map obtained by simulating a scan of the solid basic structure by an eddy current sensing unit.

4. The method according to claim 1, wherein
    each of said solid basic structures of the catalogue concerns a distinct material, a distinct surface pattern and/or a distinct geometric dimension thereof.

5. The method according to claim 1, wherein the expected integrity data is also determined based on a relative positioning of said given eddy current sensing unit with respect to the geometrical structure that the sensed portion should exhibit.

6. The method according to claim 1, wherein the sensed integrity data is provided by probing said sensed portion of the new solidified cross section by means of a plurality of distinct excitation frequencies.

7. The method according to claim 6, wherein the sensed integrity data is determined as a linear combination of subsets of said integrity measured data, each subset corresponding to one of said plurality of distinct excitation frequencies.

8. The method according to claim 6, wherein said plurality of distinct excitation frequencies comprises a first excitation frequency greater than 100 kHz and a second excitation frequency lower than 50 kHz.

9. The method according to claim 1, comprising a step of detecting a defect by comparing said difference with a given acceptable anomaly data threshold.

10. The method according to claim 1 further comprising a step of
    moving said eddy current sensing unit along a scanning path based on the 3D model of the component;
    wherein the scanning path is further based on the selected predefined solid basic structure of the catalogue.

11. The method according to claim 1, wherein the eddy current sensing unit is selected within a plurality of distinct eddy current sensors based on the 3D model of the component and on the selected solid basic structure of the catalogue.

* * * * *